(12) United States Patent
Bensch et al.

(10) Patent No.: US 8,708,430 B2
(45) Date of Patent: Apr. 29, 2014

(54) PNEUMATIC VEHICLE BRAKE SYSTEM AND CONTROL METHOD

(75) Inventors: Uwe Bensch, Hannover (DE); Jörg Helmer, Vogt (DE); Bernd-Joachim Kiel, Wunstorf (DE); Hartmut Rosendahl, Hannover (DE)

(73) Assignee: WABCO GmbH, Hannover (DE)

( * ) Notice: Subject to any disclaimer, the term of this patent is extended or adjusted under 35 U.S.C. 154(b) by 816 days.

(21) Appl. No.: 12/310,470

(22) PCT Filed: Jul. 5, 2007

(86) PCT No.: PCT/EP2007/005945
§ 371 (c)(1),
(2), (4) Date: Feb. 24, 2009

(87) PCT Pub. No.: WO2008/025404
PCT Pub. Date: Mar. 6, 2008

(65) Prior Publication Data
US 2009/0280959 A1    Nov. 12, 2009

(30) Foreign Application Priority Data
Aug. 31, 2006  (DE) .......................... 10 2006 041 008

(51) Int. Cl.
*B60T 8/34* (2006.01)
(52) U.S. Cl.
USPC ........... 303/127; 303/6.01; 303/9.61; 303/17; 303/20; 303/22.1; 303/89; 303/113.1; 303/113.4; 303/118.1; 303/122.15; 477/196; 477/198; 188/158; 188/181 T; 188/195; 701/38; 701/70; 701/78

(58) Field of Classification Search
USPC ............. 303/127, 9.61, 122.15, 113.1, 113.4, 303/22.1, 118.1; 188/158, 195
See application file for complete search history.

(56) References Cited

U.S. PATENT DOCUMENTS

| | | | | |
|---|---|---|---|---|
| 4,436,347 A | * | 3/1984 | Stumpe | 303/6.01 |
| 5,261,730 A | * | 11/1993 | Steiner et al. | 303/113.4 |
| 5,615,931 A | * | 4/1997 | Stumpe et al. | 303/22.1 |
| 6,167,354 A | * | 12/2000 | Maleki et al. | 702/147 |

(Continued)

FOREIGN PATENT DOCUMENTS

| | | | |
|---|---|---|---|
| DE | 4327759 | * | 3/1995 |
| DE | 4327759 A1 | * | 3/1995 |

(Continued)

*Primary Examiner* — Robert A Siconolfi
*Assistant Examiner* — San Aung
(74) *Attorney, Agent, or Firm* — Kramer Levin Naftalis & Frankel LLP

(57) ABSTRACT

A pneumatic vehicle brake system includes first and second groups of wheel brakes belonging, respectively, to first and second brake circuits having first and second compressed air storage tanks for providing first and second stored pressures. At least one first circuit brake cylinder is a combined spring-store/diaphragm cylinder with a spring store part for providing a parking brake and a diaphragm part for providing a service brake. If the first circuit fails, the spring store part is deaerated to engage the parking brake. A pressure sensor for measuring the first stored pressure is connected to a control unit that controls a modulator for aerating and deaerating the spring store part. The control unit generates a signal for an electrically actuatable modulator solenoid valve if the value measured by the sensor falls below a minimum value, such that the spring store part can be aerated and deaerated via the valve.

14 Claims, 3 Drawing Sheets

(56) References Cited

U.S. PATENT DOCUMENTS

| | | | |
|---|---|---|---|
| 6,202,018 B1* | 3/2001 | Stumpe et al. | 701/70 |
| 6,371,573 B1* | 4/2002 | Goebels et al. | 303/113.1 |
| 6,626,271 B1* | 9/2003 | Bohm et al. | 188/158 |
| 7,866,761 B2* | 1/2011 | Gerum et al. | 303/9.61 |
| 2005/0029859 A1* | 2/2005 | Bensch et al. | 303/89 |
| 2005/0137767 A1* | 6/2005 | Goebels et al. | 701/38 |
| 2008/0030068 A1* | 2/2008 | Bensch et al. | 303/17 |
| 2008/0149437 A1 | 6/2008 | Herges | |

FOREIGN PATENT DOCUMENTS

| | | |
|---|---|---|
| DE | 197 46 342 A1 | 4/1999 |
| DE | 198 14 867 C1 | 12/1999 |
| DE | 102 51 249 A1 | 12/2003 |
| DE | 10 2005 023 665 A1 | 11/2006 |
| EP | 1 504 975 A1 | 2/2005 |
| EP | 1 571 061 B1 | 9/2005 |
| JP | 11198780 * | 7/1999 |

* cited by examiner

Fig. 1 *Prior art*

PNEUMATIC VEHICLE BRAKE SYSTEM AND CONTROL METHOD

FIELD OF THE INVENTION

The present invention generally relates to an electropneumatic vehicle brake control system and method for controlling a parking brake.

BACKGROUND OF THE INVENTION

A known brake system of the general type under consideration is shown in FIG. 1. Referring to FIG. 1, brake system 10 is part of a vehicle having four wheels 12, each of which is provided with a wheel-speed sensor 14, which, via respective electrical lines 18, is electrically connected to a control unit 16. The wheel brakes are provided with respective brake cylinders 20, 22, wherein brake cylinders 22 of the rear axle are designed as combination spring-actuated/diaphragm cylinders. They therefore have a spring-actuator part and a diaphragm part. The spring-actuator part is a parking brake component. The diaphragm part is a service brake component.

The service brake and the parking brake are pneumatically actuated. Braking intent of the vehicle operator is converted by means of a brake actuating device 22 into a modulated brake pressure. This modulated brake pressure is supplied via compressed air lines 24, 26 and 28 to solenoid valves 30 of an anti-lock braking system and via further compressed air lines 32 to brake-cylinders 20 of the front axle. Analogously, the modulated brake pressure is supplied via compressed air lines 34, 36, 38, via a relay valve 40, further via compressed air lines 42 to solenoid valves 44 of the anti-lock braking system and further via compressed air lines 46 to combination spring-actuated/diaphragm cylinders 22 of the rear axle.

Compressed air lines 34, 36, 38, 42 and 46 to combination spring-actuated/diaphragm cylinders 22 of the rear axle form, together with further components, such as solenoid valves 44, relay valve 40 and a compressed air reservoir tank 48, a first brake circuit, referred to as brake circuit I, wherein compressed air reservoir tank 48 is pneumatically in communication via further compressed air lines 50 with brake actuating device 22 as well as relay valve 40. Analogously, compressed air lines 24, 26, 28, 32 as well as solenoid valves 30 form, together with brake cylinders 20, a second brake circuit, referred to as brake circuit II, wherein brake actuating device 22 is in communication via further compressed air lines 52 with a second compressed air reservoir tank 54. Both compressed air reservoir tanks 48, 54 are supplied with compressed air by a compressor.

The parking brake can be actuated by means of a pneumatic switch 56. The spring-actuator part of combination spring-actuated/diaphragm cylinders 22 can be vented by means of switch 56, whereby the parking brake is engaged. The parking brake is released by admission of air to the spring-actuator part. For this purpose, via compressed air lines 58, 60, 62, compressed air can be supplied to combination spring-actuated/diaphragm cylinders 22 and discharged therefrom. Also, for this purpose, compressed air control is exercised, on the one hand, via switch 56 and, on the other hand, via an inverting relay valve 64 as well as a valve 66.

At the same time, inverting relay valve 64 performs a further function. For this purpose it is in communication with the modulated pressure of front-axle brake circuit II via compressed air line 24 and a compressed air line 68, as well as with the modulated pressure of rear axle brake circuit I via compressed air line 34 and a compressed air line 70.

In the event of failure of the first brake circuit, that is, if service braking by means of brake circuit I is no longer possible, inverting relay valve 64 is tasked with activating the parking brake, or, in other words, the spring-actuator part of combination spring-actuated/diaphragm cylinders 22. Even in the event of failure of rear axle brake circuit I, therefore, the rear axle can be braked sufficiently by means of the spring actuators to achieve the necessary braking distance.

In the event of failure or drop of pressure in rear axle brake circuit I, a high modulated pressure of front-axle brake circuit II and a low or zero pressure of rear axle brake circuit I is present at inverting relay valve 64. For this purpose, the inverting relay valve is designed such that, in the event of such a pressure difference between the modulated pressures of the two brake circuits I and II, it lowers the output pressure at inverting relay valve 64, or, in other words, the pressure in compressed air line 60. Thereby, the spring actuators of brake cylinders 22 of the rear axle are vented, so that the parking brake is able to assist or take over the function of the service brake. Even in the event of failure of the rear axle brake circuit, therefore, a specified braking distance can be achieved.

SUMMARY OF THE INVENTION

Generally speaking, it is an object of the present invention to simplify such known brake systems. In accordance with embodiments of the present invention, a pneumatic brake system for a vehicle includes pneumatically actuatable brake cylinders for actuation of wheel brakes. Together with other components, such as compressed air lines, valves and a first compressed air reservoir tank for supplying a first reservoir pressure, a first group of wheel brakes forms a first brake circuit. Together with other components, such as compressed air lines, valves and a second compressed air reservoir tank for supplying a second reservoir pressure, a second group of wheel brakes forms a second brake circuit. At least one brake cylinder of the first brake circuit is designed as a combination spring-actuated/diaphragm cylinder with a spring-actuator part for supplying a parking brake and a diaphragm part for supplying the service brake. In the event of failure of the first brake circuit, the spring-actuator part can be vented in order to engage the parking brake. According to embodiments of the present invention, a pressure sensor for measuring the first reservoir pressure is provided for this purpose and is connected to an electronic control unit. This electronic control unit controls a modulator for modulation of the compressed air to the spring-actuator part, so that admission of air to and venting of the spring-actuator part can be achieved. The control unit generates an electrical control signal for an electrically actuatable solenoid valve of the modulator, by means of which the supply or discharge of compressed air to or from the spring-actuator part can be controlled indirectly, or, in other words, by involvement of further devices, such as an air-flow-boosting valve device, or directly. This control signal is generated when the value measured by the first pressure sensor has dropped below a predetermined minimum pressure value. In this case, the control logic recognizes that the first brake circuit has failed. The control logic then drives the solenoid valve of the modulator such that the spring-actuator part of the spring-actuated/diaphragm cylinder is vented, thus ensuring that the parking brake is engaged continuously or temporarily.

By means of the pressure sensor and of the design of the control unit, the conventional inverting relay valve can be omitted. The brake system can therefore be designed without this component. In this way, the brake system has a simpler and less costly construction.

According to another embodiment of the present invention, a second pressure sensor for measuring the pressure of the second brake circuit modulated by means of a brake actuating device is provided and connected to the electronic control unit, wherein the control signal for the solenoid valve can be generated as a function of the value measured by the second pressure sensor. By virtue of the measurement of the modulated pressure of the second brake circuit and the generation of the control signal as a function of this measured modulated pressure value, the brake force exerted by the spring-actuator part can be made to depend on actuation of the brake actuating device by the vehicle operator. Even in the event of failure of the first brake circuit, therefore, braking of the wheels belonging to this brake circuit is achieved by means of the parking brake and, indeed, in a manner that can be metered by the vehicle operator, since the corresponding brake pressure is modulated as a function of the operator's intent.

According to a further embodiment of the present invention, the control signal for the solenoid valve can be generated as a function of a signal representing the braking intent of the vehicle operator. For this purpose, the braking intent of the vehicle operator is recorded and converted into a signal. This signal can be obtained in various ways. Advantageously, therefore, the signal representing the vehicle operator's intent is an electrical analog or digital signal generated by an electronic brake system. As an example, such signals are specified as digital messages, especially the SAE message "brake pedal position", with a range of values from 0 to 100, for example. Such a message is processed by the electronic control unit, which then generates the control signal for the solenoid valve for admitting air to and venting of the spring actuator.

Advantageously, the control signal for this solenoid valve is generated as a function of a brake actuating signal, which is supplied by means of a displacement sensor disposed on the brake pedal. In this way, the position of the brake pedal is sensed and, thus, associated with the braking intent of the vehicle operator. The signal generated by this sensor is processed, in turn, in the electronic control unit, in order to supply the control signal for the solenoid valve.

According to another embodiment of the present invention, the control signal for the solenoid valve is generated as a function of an electrical signal, which is passed to an electrically controllable valve for control of the pressure in the second brake circuit. As an example, this valve can be a proportional relay valve, which is opened or closed by means of an electrical signal in order to activate the pressure in the second brake circuit. This electrical signal, in turn, also represents the braking intent of the vehicle operator. Therefore, this signal can also be used by the electronic control unit in order to supply the control signal for the solenoid valve.

According to yet another embodiment of the present invention, a third pressure sensor is provided for measuring pressure supplied by the modulator to the spring-actuator part, the third pressure sensor also being connected to the electronic control unit. After the measurement of the pressure value, the measured pressure value is compared with the modulated pressure of the second brake circuit measured by means of the second pressure sensor, or the two measured pressure values are mutually offset and the control signal is regulated as a function of the result obtained thereby. In this way, the brake force exerted by means of the parking brake on the wheel brakes associated with the first brake circuit can be adapted to the brake force of the wheel brakes associated with the second brake circuit. This brake force of the first brake circuit can, in principle, be adjusted to be higher or lower than or exactly equal to the brake force of the second circuit. This adjustment is guided by the vehicle structure and, possibly, by its load condition.

According to yet a further embodiment of the present invention, the control unit is connected to wheel-speed sensors and/or to a controller of an anti-lock braking system, in order that locking of the wheels of the first brake circuit can be detected in this way. For this purpose, the speeds of the wheels of the first brake circuit are measured. If a sudden decrease of the wheel speed or immobilization of the wheels of the first brake circuit occurs, locking of the wheels or of one of the wheels is detected. In this case, the speed of the wheel does not correspond to the vehicle speed. In the event of locking, air is admitted to the spring-actuator part, because the control unit changes the control signal to the solenoid valve in a way that ensures admission of air to the spring-actuator part. As a result, the parking brake is released. If it is found thereafter in a new measurement of the speeds of the wheels of the first brake circuit that the wheel speeds correspond to the vehicle speed, the spring-actuator part can be vented again and, thus, the parking brake can be engaged again. In this way, anti-lock protection can be achieved even in the case of braking by means of the spring actuators.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
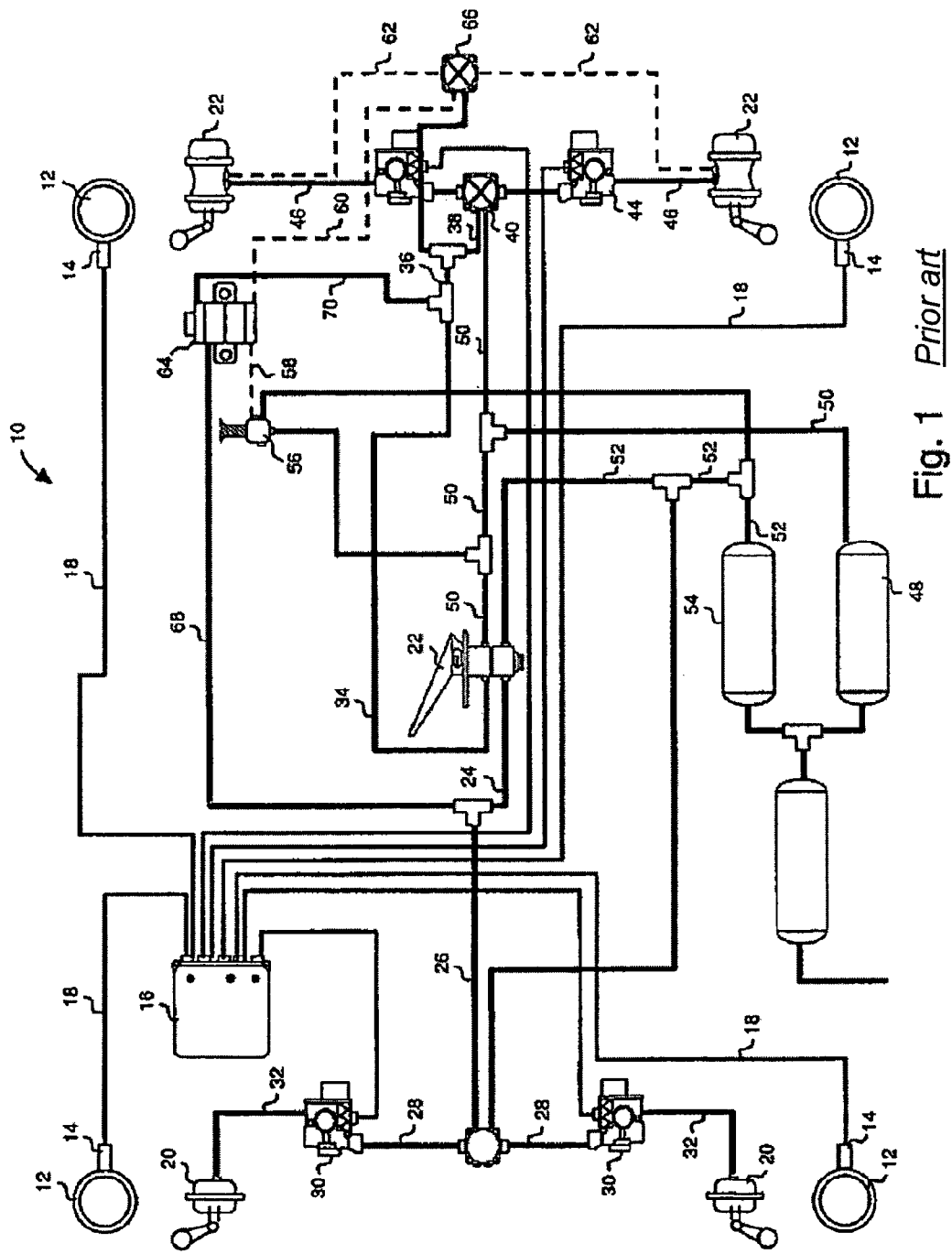
FIG. 1 depicts a conventional (prior art) brake system.
Figure 2:
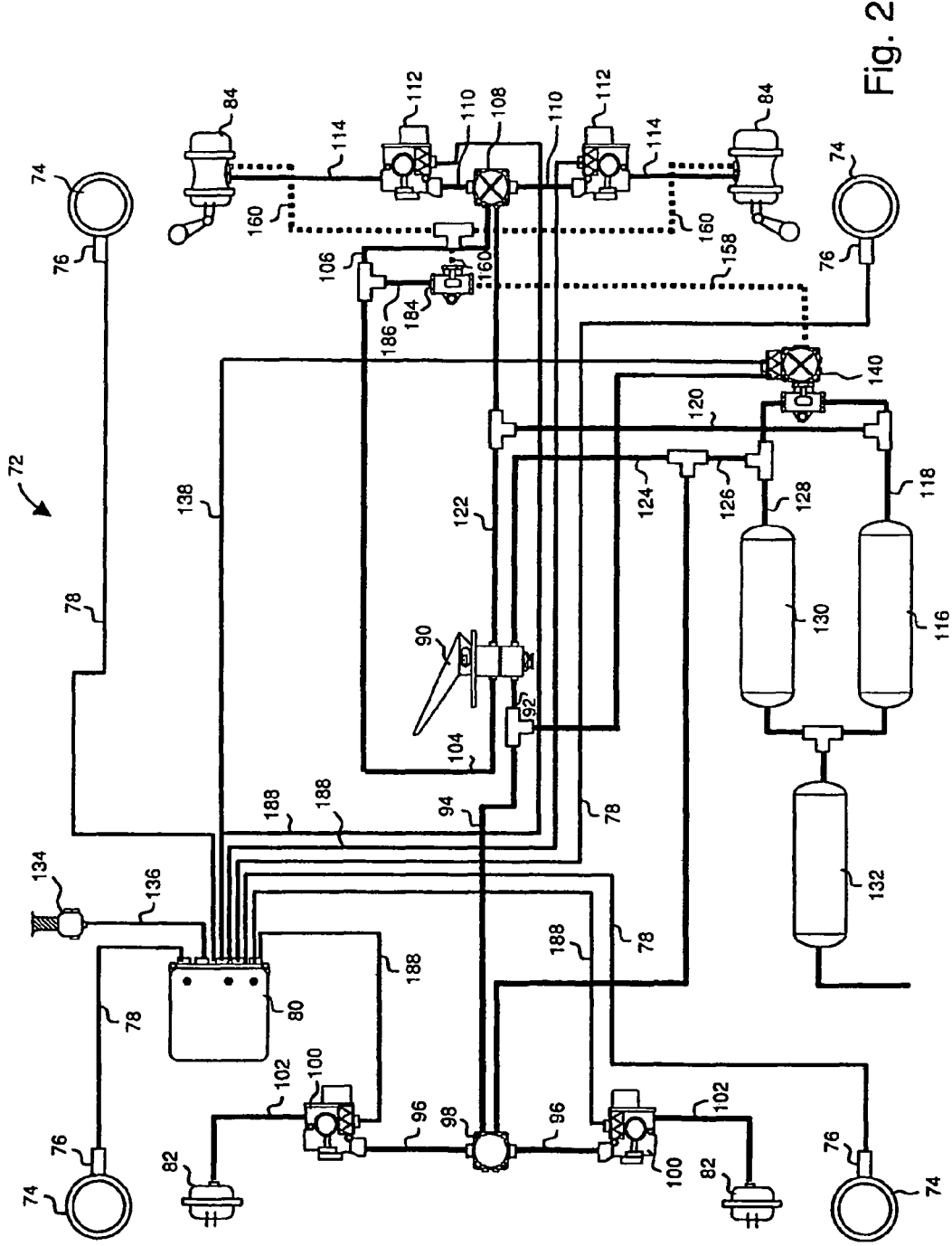
FIG. 2 depicts an exemplary embodiment of an inventive brake system.
Figure 3:
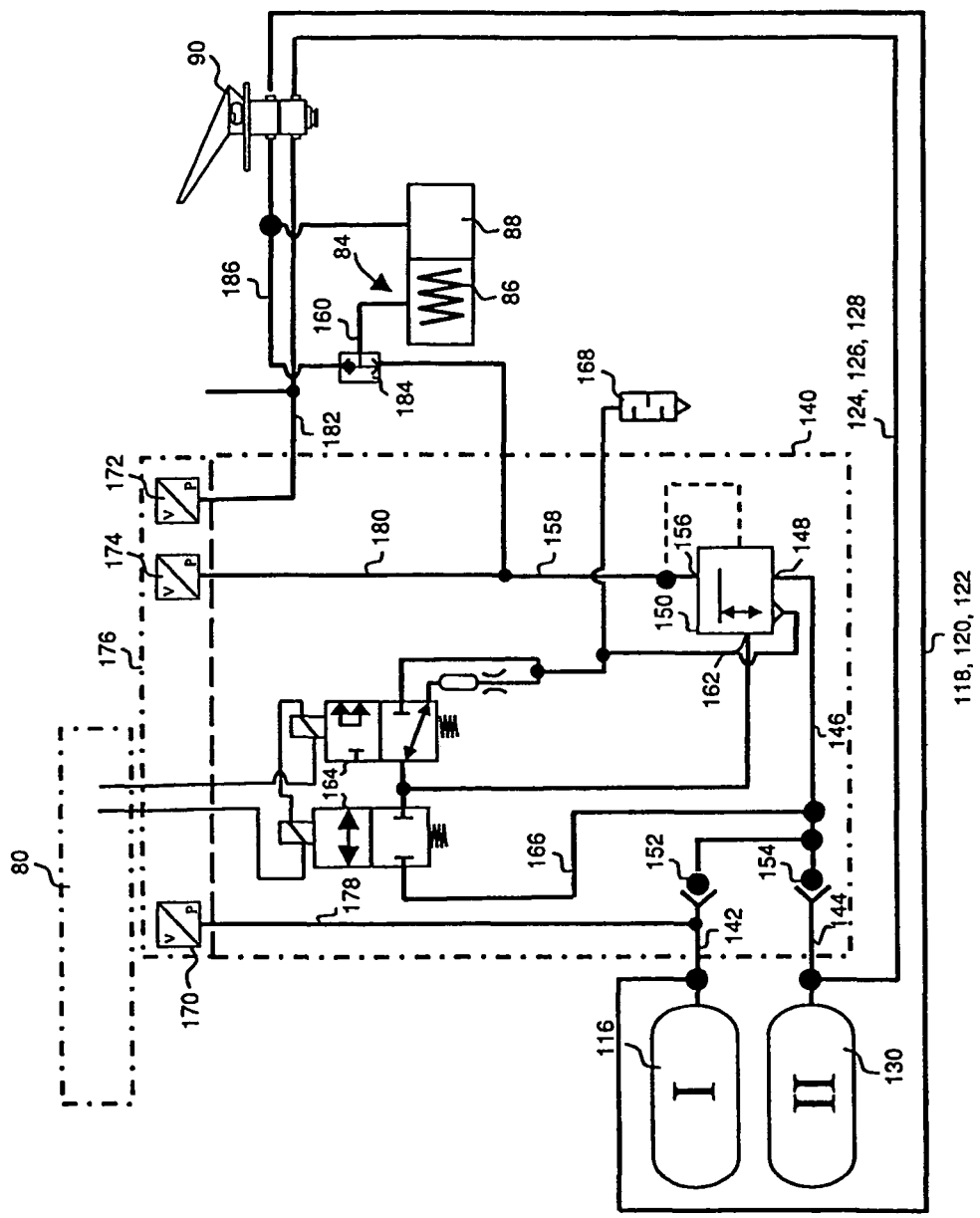
FIG. 3 is a schematic view of part of the brake system depicted in FIG. 2.

FIG. 2 shows, for a vehicle having a plurality of wheels, namely four wheels 74 in the illustrated example, each wheel being provided with a wheel-speed sensor 76, which is connected electrically via a respective electrical line 78 to an electronic control unit 80, an inventive brake system 72, which can be implemented in vehicles such as, for example, commercial vehicles, heavy motor trucks, buses, etc. Wheels 74 are provided with respective wheel brakes having brake cylinders 82, 84, wherein brake cylinders 84 are associated with a rear axle and are designed as combination spring-actuated/diaphragm cylinders. Brake cylinders 84 are, therefore, each provided with a spring-actuator part 86 and a diaphragm part 88, as shown in FIG. 3. Spring-actuator part, 86 is a component of the parking brake, whereas diaphragm part 88 is a component of the service brake.

According to an exemplary embodiment of the present invention, both the service brake and the parking brake are pneumatically actuated or released. Braking intent of the vehicle operator is converted by means of a brake pedal of a brake actuating device 90 into a modulated brake pressure. The modulated brake pressure is supplied via compressed air lines 92, 94, 96, preferably, via relay valve 98, solenoid valves 100 of an anti-lock braking system and via further compressed air lines 102, to brake cylinders 82 of a front axle of the vehicle. Analogously, the modulated brake pressure for the rear axle is passed from brake actuating device 90 via further compressed air lines 104, 106, via an air-flow-boosting valve device or a relay valve 108, further via compressed air lines 110 to solenoid valves 112 of the anti-lock braking system and then further via compressed air lines 114 to combination spring-actuated/diaphragm cylinders 84.

Compressed air lines 104, 106, 110, 114 as well as air-flow-boosting valve device 108 and solenoid valves 112, together with further components, especially a compressed air reservoir tank 116 and compressed air lines 118, 120 and 122 from compressed air reservoir tank 116 to brake actuating device 90, form a first brake circuit, referred to as brake circuit I or rear axle brake circuit. Analogously, compressed air lines 92, 94, 96, 102 as well as relay valve 98, if applicable, and solenoid valves 100 form a second brake circuit, referred to as brake circuit II or front-axle brake circuit, wherein brake actuating device 90 is in communication via further compressed air lines 124, 126, 128 with a second compressed air reservoir tank 130. Both compressed air reservoir tanks 116, 130 are supplied with compressed air by a compressor or a common compressed air reservoir 132.

A parking brake is formed by the following components among others: an electrical actuating device 134, such as, for example, a switch or other suitable control element, is connected via an electrical line 136 to electronic control unit 80. The parking brake can be actuated by means of electrical actuating device 134. Therefore, by means of electrical actuating device 134, the parking brake can be engaged or released or held in a partly engaged condition.

Electronic control unit 80 is connected via further electrical lines 138 to a modulator 140 for modulating compressed air at spring-actuator part 86 (FIG. 3) of combination spring-actuated/diaphragm cylinders 84.

FIG. 3 shows the construction of modulator 140. Modulator 140 is in communication with first compressed air reservoir tank 116 and second compressed air reservoir tank 130. From compressed air reservoir tanks 116, 130, compressed air passes via compressed air lines 142, 144, 146 to inlet 148 of an air-flow-boosting valve device 150, which is designed, for example, as a relay valve. Air-flow-boosting valve device 150 is protected by means of check valves 152, 154 from leaks in compressed air reservoir tanks 116, 130 or in compressed air lines 142, 144. Check valves 152, 154 ensure that compressed air cannot escape in uncontrolled manner at inlet 148 of air-flow-boosting valve device 150 in the event of damage in the region of compressed air reservoir tanks 116, 130 or their supply to modulator 140.

An outlet 156 of air-flow-boosting valve device 150 leads, via compressed air lines 158, 160, to spring-actuator part 86 of spring-actuated/diaphragm cylinder 84.

A control input 162 of the air-flow-boosting valve device leads to a solenoid valve 164, which can be electrically actuated by control unit 80. Valve 164 is in pneumatic communication via a compressed air line 166 with compressed air line 146 and, therefore, with compressed air reservoir tanks 116, 130. By means of solenoid valve 164, compressed air can be supplied in metered manner at control input 162 of air-flow-boosting valve device 150. This supplied pressure has a maximum value equal to that of the pressure made available by compressed air reservoir tanks 116, 130. By virtue of the design of solenoid valve 164, however, it is also able to supply a lower pressure at control input 162 and, in particular, to vent control input 62 slowly or suddenly.

The pressure made available at control input 162 is reproduced by air-flow-boosting valve device 150 at its outlet 156. However, the air flow made available with corresponding pressure by air-flow-boosting valve device 150 is substantially greater than the air flow supplied at control input 162. By means of solenoid valve 164 and air-flow-boosting valve device 150, a large air flow with high pressure can be made available at spring-actuator part 86 of the combination spring-actuated/diaphragm cylinders, in order to compress the actuator springs and, thus, release the parking brake. To the extent that the pressure at outlet 156 of air-flow-boosting valve device 150 is lowered, the spring actuators can relax and, thus, engage the parking brake.

For the purpose of venting, air-flow-boosting valve device 150 is in communication with a venting device 168, via which the compressed air from spring-actuator part 86 can escape to atmosphere via compressed air line 158 and air-flow-boosting valve device 150. Furthermore, solenoid valve 164 is also in communication with venting device 168, to ensure that the pressure present at control input 162 of air-flow-boosting valve device 150 can escape.

Modulator 140 is further provided with three pressure sensors 170, 172, 174, which each convert a measured pressure into an electrical signal and conduct these respective electrical signals to control unit 80 via electrical lines. These pressure sensors 170, 172, 174 are preferably disposed in a cover 176 of modulator 140 and, via pneumatic lines 178, 180, 182, are in communication with their respective measuring points.

A first pressure sensor 170 measures the pressure of first compressed air reservoir tank 116, albeit within modulator 140. In another exemplary embodiment, however, it can also make its measurements outside modulator 140, at another location. A second pressure sensor 172 measures the modulated pressure for the second brake circuit, meaning circuit II or front-axle brake circuit. A third pressure sensor 174 measures the pressure at outlet 156 of air-flow-boosting valve device 150 and, thus, the pressure supplied to spring-actuator part 86 of combination spring-actuated/diaphragm cylinder 84.

In the event of failure of the first brake circuit (circuit I or rear axle brake circuit), the pressure measured by first pressure sensor 170 drops. Such a drop can be detected by comparison of the value measured by first pressure sensor 170 with a predefined minimum pressure value. If such a drop is detected, control unit 80 generates a control signal for solenoid valve 164, so that solenoid valve 164 vents control input 162 of air-flow-boosting valve device 150, with the result that spring-actuator part 86 of combination spring-actuated/diaphragm cylinder 84 is also vented. Thus, the spring actuator is pulled in, or, in other words, the parking brake is engaged, and, so, a braking action is achieved at the corresponding wheel brake, even though the service-brake circuit (circuit I or rear axle brake) to this wheel brake has failed and, thus, diaphragm part 88 of combination spring-actuated/diaphragm cylinder 84 can no longer be actuated.

In this way, the parking brake can also be used automatically to achieve the planned braking distance even in the event of failure of a brake circuit of the service brake.

The control signal supplied to solenoid valve 164 is determined as a function of the pressure value measured by second pressure sensor 172. Specifically, second pressure sensor 172 determines a pressure value that corresponds to the braking intent of the vehicle operator, albeit for the second brake circuit (circuit II or front-axle brake circuit). This brake circuit is assumed to be still intact, and, so, the measured pressure value determined by second pressure sensor 172 is processed as a value that corresponds to the vehicle operator's braking intent.

A high pressure value of second pressure sensor 172 means intensive braking. Consequently, solenoid valve 164 is controlled by means of the solenoid-valve control signal such that rapid venting takes place at control input 162 of air-flow-boosting valve device 150 and, thus, spring-actuator part 86 is also vented rapidly. In this way, the spring actuator can be pulled in rapidly, allowing the actuator spring to exert a high force on the corresponding wheel brake.

When the vehicle operator's intent is only a small braking action, however, or, in other words, the pressure value measured by second pressure sensor 172 is small, the control signal at solenoid valve 164 is correspondingly adjusted, so that the pressure at control input 162 of air-flow-boosting valve device 150 is lowered only slightly. In this way, the pressure in spring-actuator part 86 is also reduced only slightly, and the braking action of the parking brake is only slight.

If the vehicle operator is no longer actuating brake actuating device 90, or, in other words, is no longer expressing any braking intent, solenoid valve 164 regulates the pressure at control input 162 of air-flow-boosting valve device 150 back to a high value, so that spring-actuator part 86 is again pressurized with a high pressure. In this way, the parking brake can be released.

Second pressure sensor 172 is advantageously disposed in modulator 140 or in its cover 176. Alternatively, however, it can be disposed at any other position of the second brake circuit, meaning, in particular, that it can also be disposed outside modulator 140 or its cover 176.

Instead of or in addition to a signal of second pressure sensor 172, the control signal for solenoid valve 164 can also be generated in another way, for example, as a function of a data signal representing braking intent of the vehicle operator. Such a data signal is used, for example, by an electronic brake system. It is typically a digital data signal, representing a value between 0 and 100%, for example.

Furthermore, the control signal for solenoid valve 164 can be generated additionally or alternatively as a function of a brake actuating signal, which can be generated by means of a displacement sensor disposed on brake actuating device 90. The displacement signal detects the braking intent of the vehicle operator and converts it into an electrical signal.

Furthermore, the control signal for solenoid valve 164 can also be generated additionally or alternatively as a function of an electrical signal, which is passed to a proportional relay valve for control of the pressure in the second brake circuit. The electrical signal to the proportional relay valve can be, for example, the actuating current or the actuating voltage for actuating the proportional relay valve.

The braking intent of the vehicle operator can, therefore, be determined in diverse ways., which can be evaluated either individually or in any combination by control unit 80 and converted into a control signal for solenoid valve 164.

By means of third pressure sensor 174, it is possible to check the pressure at outlet 156 of air-flow-boosting valve device 150 or the pressure in spring-actuator part 86 of combination spring-actuated/diaphragm cylinder 84. If the pressure measured by the third pressure sensor is not in agreement with the intended pressure value, the control signal to solenoid valve 164 can be adjusted appropriately. In this way, a closed regulating circuit is formed for setting the desired pressure in spring-actuator part 86.

FIGS. 2 and 3 also show an overload-protection valve or select-high valve 184, which is connected between outlet 156 of the air-flow-boosting valve device, a compressed air line 186 conveying the modulated pressure and compressed air line 160 to the spring-actuated brake cylinder. Overload-protection valve 184 selects the higher of the two pressures, namely, the modulated brake pressure or the pressure made available by the air-flow-boosting valve device, and it supplies the higher pressure to spring-actuator part 86 of combination spring-actuated/diaphragm cylinder 84. Overload-protection valve 184 prevents addition of the brake force supplied by the service brake, or, in other words, via the pneumatic part or diaphragm part 88, to the brake force supplied by the parking brake, or, in other words, spring-actuator part 86, so that mechanical overloading of the brake mechanism of the wheel brake associated with this brake cylinder is prevented. By virtue of the illustrated structure, the brake force supplied to the brake cylinder via diaphragm part 88 is not increased by the brake force exerted by spring-actuator part 86, since, in the case of actuation of the service brake, the brake force exerted by the actuator spring is reduced by a force corresponding to actuation of the service brake. In this way, critical overloading of the corresponding wheel brake can be avoided.

As discussed above in connection with FIG. 2, the brake system is provided with solenoid valves 100, 112, which form the components of an anti-lock braking system. This anti-lock braking system is also controlled by control unit 80. If one of wheel sensors 86 detects locking of one of wheels 74, control unit 80 sends an electrical signal via an electrical line 188 to the corresponding solenoid valve 100, 112, so that the brake pressure being supplied is reduced if necessary, in order to stop the locking of corresponding wheel 74.

However, if the parking brake is being used to assist the service brake in the event of failure of the first brake circuit, anti-lock protection of the wheels of the corresponding axle is nevertheless ensured according to the present invention. For this purpose, the speed values of wheels 74 measured by speed sensors 76 are evaluated in control unit 80. If it becomes evident, on the basis of the measured wheel speeds, that a wheel of the first brake circuit is locked, air is admitted to spring-actuator part 86 in order to release the parking brake. As soon as it becomes evident, on the basis of the measured wheel speed, that the wheel is again revolving with the speed corresponding to the vehicle speed, spring-actuator part 86 can be vented again in order to actuate the parking-brake function.

In this way, effective anti-lock protection can also be achieved by using the spring-actuated brakes instead of the service brake.

By virtue of the present invention it is possible to provide a simplified brake system that operates successfully without an inverting relay valve, but nevertheless, in the event of failure of the first brake circuit, provides an adequate braking action by means of the parking-brake function on the wheel brakes of this brake circuit. Furthermore, by virtue of the electrical control components used, anti-lock protection can be achieved even during braking by means of the parking-brake function.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

LIST OF REFERENCE NUMERALS

10 Brake system
12 Wheel
14 Wheel-speed sensor
16 Control unit
18 Electrical line
20 Brake cylinder
22 Brake actuating device
24 Compressed air line
26 Compressed air line
28 Compressed air line
30 Solenoid valve
32 Compressed air line
34 Compressed air line
36 Compressed air line
38 Compressed air line
40 Relay valve
42 Compressed air line
44 Solenoid valve
46 Compressed air line
48 Compressed air reservoir tank
50 Compressed air line
52 Compressed air line
54 Compressed air reservoir tank
56 Pneumatic switch
58 Compressed air line
60 Compressed air line
62 Compressed air line
64 Inverting relay valve
66 Valve
68 Compressed air line
70 Compressed air line
72 Brake system
74 Wheel
76 Wheel-speed sensor
78 Electrical line
80 Control unit
82 Brake cylinder
84 Brake cylinder
86 Spring-actuator part
88 Diaphragm part
90 Brake actuating device
92 Compressed air line
94 Compressed air line
96 Compressed air line
98 Valve
100 Solenoid valve
102 Compressed air line
104 Compressed air line
106 Compressed air line
108 Air-flow-boosting valve device
110 Compressed air line
112 Solenoid valve
114 Compressed air line
116 First compressed air reservoir tank
118 Compressed air line
120 Compressed air line
122 Compressed air line
124 Compressed air line
126 Compressed air line
128 Compressed air line
130 Second compressed air reservoir tank
132 Common compressed air reservoir
134 Electrical actuating device
136 Electrical line
138 Electrical line
140 Modulator
142 Compressed air line
144 Compressed air line
146 Compressed air line
148 Inlet
150 Air-flow-boosting valve device
152 Check valve
154 Check valve
156 Outlet
158 Compressed air line
160 Compressed air line
162 Control input
164 Solenoid valve
166 Compressed air line
168 Venting device
170 First pressure sensor
172 Second pressure sensor
174 Third pressure sensor
176 Cover
178 Pneumatic line
180 Pneumatic line
182 Pneumatic line
184 Overload-protection valve or select-high valve
186 Compressed air line
188 Electrical line

What is claimed is:

1. A pneumatic brake system for a vehicle, comprising pneumatically actuatable brake cylinders for actuation of wheel brakes, a first brake circuit including a first group of said wheel brakes and a first compressed air reservoir tank for supplying a first reservoir pressure, a second brake circuit including a second group of said wheel brakes and a second compressed air reservoir tank for supplying a second reservoir pressure, said first brake circuit including at least one combination spring-actuated/diaphragm brake cylinder having a spring-actuator part for supplying a parking brake of a wheel of said vehicle and a diaphragm part for supplying a service brake of said wheel, said spring-actuator part being configured to be vented to engage said parking brake in the event of failure of said first brake circuit, an electronic control unit that controls a modulator for admitting air to said spring-actuator part and for venting said spring-actuator part, said control unit being connected to at least one wheel-speed sensor for sensing a wheel speed of said wheel and configured to (1) determine, from said sensed wheel speed, whether said wheel is revolving with a speed that corresponds to a speed of said vehicle and (2) generate an electrical control signal for an electrically actuatable solenoid valve of said modulator to at least one of directly and indirectly effect admission of air into said spring-actuator part when it is determined that said wheel is not revolving with a speed that corresponds to said speed of said vehicle and venting of said spring-actuator part when it is determined that said wheel is revolving at a speed that corresponds to said speed of said vehicle.

2. The brake system according to claim 1, further comprising a second pressure sensor connected to said electronic control unit for measuring a modulated pressure of said second brake circuit modulated by a brake actuating device, wherein said control signal for said solenoid valve is generated as a function of said second reservoir pressure measured by said second pressure sensor.

3. The brake system according to claim 1, wherein said control signal for said solenoid valve is generated as a function of a signal representing a braking intent.

4. The brake system according to claim 3, wherein said signal representing said braking intent is generated by an electronic brake system.

5. The brake system according to claim 1, wherein said control signal for said solenoid valve is generated as a function of a brake actuating signal generated by a displacement sensor disposed on a brake pedal.

6. The brake system according to claim 1, wherein said control signal for said solenoid valve is generated as a function of an electrical signal passed to an electrically controllable valve for control of said modulated pressure in said second brake circuit.

7. The brake system according to claim 1, further comprising a third pressure sensor connected to said electronic control unit for measuring a pressure supplied by said modulator to said spring-actuator part.

8. The brake system according to claim 7, wherein, by means of said control unit, said control signal is generated as a function of a pressure value measured by said third pressure sensor.

9. The brake system according to claim 1, wherein said modulator includes an air-flow-boosting valve device having a control input in communication with an outlet of said solenoid valve, an inlet in communication with at least one of said first compressed air reservoir tank, said second compressed air reservoir tank and a third compressed air reservoir tank, and an outlet in communication with said spring-actuator part, and wherein said air-flow-boosting valve device is in communication with a venting device.

10. A method for controlling a pneumatic brake system of a vehicle according to claim 1, comprising the steps of:
   a) sensing said wheel speed of said wheel,
   b) comparing said sensed wheel speed with said speed of said vehicle, and
   c) generating said electrical control signal for control of said solenoid valve when said sensed wheel speed corresponds to said speed of said vehicle, wherein said control signal drives said solenoid valve to vent said spring-actuator part of said at least one combination spring-actuated/diaphragm cylinder to engage said parking brake.

11. The method according to claim 10, further comprising the steps of:
   a) measuring a modulated pressure of said second brake circuit, and
   b) generating said control signal as a function of said modulated pressure, wherein a brake force exerted by said spring-actuator part is dependent on actuation of a brake actuating device.

12. The method according to claim 11, further comprising the steps of:
   a) measuring a pressure supplied by said modulator to said spring-actuator part,
   b) comparing said pressure supplied by said modulator with said modulated pressure, and
   c) adjusting said control signal when said step of comparing indicates a deviation larger than a predetermined difference value.

13. The method according to claim 10, further comprising the step of admitting air into said spring-actuator part to disengage said parking brake when said sensed wheel speed does not correspond to said speed of said vehicle.

14. The brake system according to claim 1, further comprising a first pressure sensor for measuring said first reservoir pressure, said first pressure sensor being connected to said electronic control unit, wherein said electronic control unit is further configured to generate said electrical control signal for said electrically actuatable solenoid valve of said modulator to at least one of directly and indirectly effect at least one of admission of air into said spring-actuator part and venting of said spring-actuator part when said first reservoir pressure measured by said first pressure sensor falls below a predetermined minimum pressure value.

* * * * *

UNITED STATES PATENT AND TRADEMARK OFFICE
CERTIFICATE OF CORRECTION

PATENT NO. : 8,708,430 B2 Page 1 of 1
APPLICATION NO. : 12/310470
DATED : April 29, 2014
INVENTOR(S) : Bensch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Twenty-ninth Day of September, 2015

Michelle K. Lee
*Director of the United States Patent and Trademark Office*